(12) United States Patent
Kasper

(10) Patent No.: US 9,608,398 B2
(45) Date of Patent: Mar. 28, 2017

(54) APPARATUS FOR PROTECTING POWERED OPTICAL AMPLIFIERS

(71) Applicant: LGS Innovations LLC, Herndon, VA (US)

(72) Inventor: Albin L. Kasper, Herndon, VA (US)

(73) Assignee: LGS INNOVATIONS LLC, Herndon, VA (US)

( * ) Notice: Subject to any disclaimer, the term of this patent is extended or adjusted under 35 U.S.C. 154(b) by 280 days.

(21) Appl. No.: 14/185,479

(22) Filed: Feb. 20, 2014

(65) Prior Publication Data
US 2015/0236475 A1 Aug. 20, 2015

(51) Int. Cl.
| H01S 3/067 | (2006.01) |
| H01S 3/094 | (2006.01) |
| H01S 3/13 | (2006.01) |
| H01S 3/14 | (2006.01) |

(52) U.S. Cl.
CPC ........ H01S 3/1302 (2013.01); H01S 3/06754 (2013.01); H01S 3/094003 (2013.01); *H01S 3/06762* (2013.01); *H01S 3/094011* (2013.01); *H01S 3/094023* (2013.01); *H01S 3/14* (2013.01)

(58) Field of Classification Search
CPC ............... H01S 3/1302; H01S 3/06754; H01S 3/094003; H01S 3/094015
See application file for complete search history.

(56) References Cited

U.S. PATENT DOCUMENTS

| 5,991,068 A * | 11/1999 | Massicott | ............ H01S 3/1302 359/337 |
| 6,512,629 B1 * | 1/2003 | Dijaili | .................. H01S 5/1032 359/344 |
| 6,751,013 B1 * | 6/2004 | Wu | ....................... H01S 3/1302 359/337 |
| 2002/0114605 A1 * | 8/2002 | Handerek | ............. G02B 6/243 385/139 |

* cited by examiner

*Primary Examiner* — Eric Bolda
(74) *Attorney, Agent, or Firm* — Baker and Hostetler LLP

(57) ABSTRACT

The present application is directed to an optical apparatus including an optical waveguide configured to receive an optical signal at an input wavelength. The apparatus also includes one or more optical pump sources connected to transmit pump light to the optical gain medium for the optical gain medium to amplify the optical signal. The apparatus also includes an optical feedback loop for a protection wavelength that includes the optical gain medium and at least a portion of the optical waveguide. A round-trip optical gain of the optical feedback loop is higher at an optical wavelength of the pump light than at the input wavelength less than unity in the presence of the optical signal. In addition, the round-trip gain of the optical feedback loop is greater than or equal to unity in the absence of the optical signal.

20 Claims, 7 Drawing Sheets

580

Provide an optical waveguide having an optical gain medium therein, to amplify an optical signal input into the optical waveguide, the optical waveguide including an optical feedback loop

585

Coupling a source of pump light to the optical waveguide such that the pump light is able to cause the gain medium to amplify an optical signal input into the optical waveguide, wherein an optical gain is such that the round trip gain in the optical feedback loop for the protection wavelength is less than unity in the presence of the optical input signal, and wherein an optical gain is such that the round trip gain in the optical feedback loop for the protection wavelength is greater than or equal to unity in the absence of the optical signal.

FIG. 5B

APPARATUS FOR PROTECTING POWERED OPTICAL AMPLIFIERS

TECHNICAL FIELD

This application is directed, in general, to aoptical amplifiers for optical communications systems and methods of manufacturing and use thereon.

BACKGROUND

This section introduces aspects that may be helpful to facilitating a better understanding of the inventions. Accordingly, the statements of this section are to be read in this light and are not to be understood as admissions about what is in the prior art or what is not in the prior art.

In optical communications systems, optical amplifiers are increasingly pumped with higher amounts of power to produce increasingly higher levels of optical amplification of an optical communication input signal. If the optical communication input signal is suddenly lost, however, the optical amplifier can malfunction by lasing, and, in some cases, damage itself or other components of the system. In some cases to deter this behavior, a standby seed laser with a fast turn on time is used. In the event that the input signal goes missing, the standby laser is intended to quickly turn on to protect the amplifier.

SUMMARY OF ILLUSTRATIVE EMBODIMENTS

One embodiment is an apparatus, comprising an optical waveguide configured to receive an optical signal at an input wavelength, the optical waveguide including an optical gain medium. The apparatus also comprises one or more optical pump sources connected to transmit pump light to the optical gain medium such that the optical gain medium is able to amplify the optical signal. The apparatus also comprises an optical feedback loop that includes the optical gain medium and at least a portion of the optical waveguide, wherein a round-trip optical gain of the optical feedback loop is higher at an optical wavelength of the pump light than at the input wavelength.

Another embodiment is a method. The method comprises providing an optical waveguide having an optical gain medium therein, to amplify an optical signal input into the optical waveguide, the optical waveguide including an optical feedback loop. The method comprises coupling a source of pump light to the optical waveguide such that the pump light is able to cause the gain medium to amplify an optical signal input into the optical waveguide; wherein an optical gain is such that the round trip gain in the optical feedback loop for the protection wavelength is less than unity in the present of the optical input signal, and wherein an optical gain is such that the rounc trip gain in the optical feedback loop for the protection wavelength is greater than or equal to unity in the absence of the optical signal.

Another embodiment is another method. The method can comprise forming a laser cavity, including: passing a pump light, emitted from a pump source, through an optical feedback loop that includes an optical gain medium that can absorb the pump light and emit light at a protection wavelength. The optical feedback loop includes at least a portion of a waveguide pathway that is configured to receive an input light at an input wavelength configured to carry an optical signal. A maximum round-trip gain of light within the optical feedback loop occurs at a protection wavelength. The protection wavelength is different from the input wavelength. a net round trip gain in amplitude of the emitted light at the protection wavelength through the optical feedback loop is greater than or equal to one in the absence of the input light.

BRIEF DESCRIPTION OF THE DRAWINGS

Reference is now made to the following descriptions taken in conjunction with the accompanying drawings, in which:

FIG. 5B presents a flow diagram illustrating an alternative method of the disclosure.

In the Figures and text, similar or like reference symbols indicate elements with similar or the same functions and/or structures.

Figure 1:
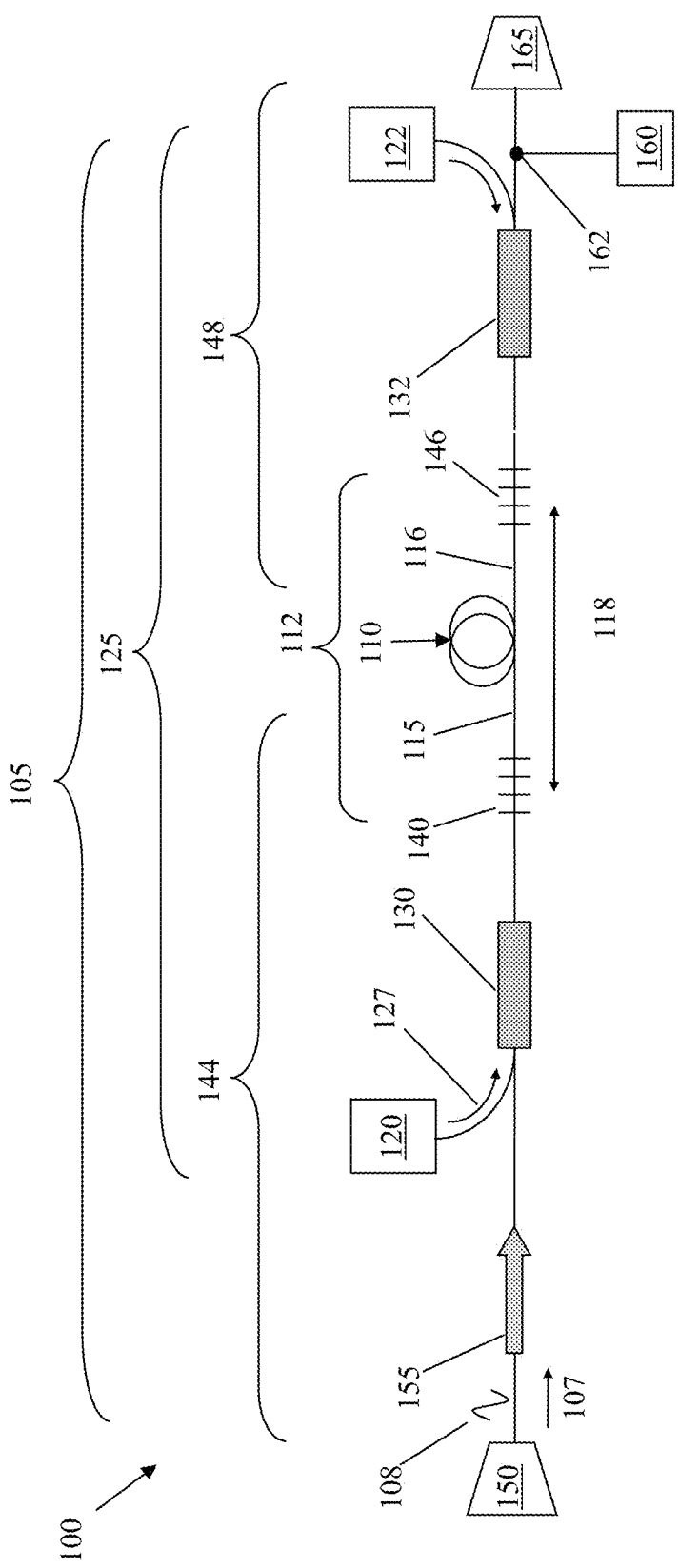
FIG. 1 presents a schematic view of an embodiment of one embodiment of an apparatus of the disclosure having strong and weak reflectors in a waveguide pathway that includes an optical feedback loop.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

The present invention benefits from the recognition that the use of a standby laser to safeguard an optical amplifier has a number of undesirable features. The standby laser can occupy valuable space on the circuit powering and controlling the amplifier and additional circuitry has to be added to power and control the standby laser. As the amount of power being pumped into the amplifier increases, the turn-on time window for the standby laser may become prohibitively short to stop the amplifier from building up enough gain to start, potentially destructive, spontaneous lasing.

The present invention provides an alternative apparatus and method of protecting the amplifier that eliminates the need for a dedicated standby laser and the need to switch on such a laser within a narrow time window. Instead, a pump source (e.g., one or more pump lasers in some embodiment), already present and actively pumping light into the amplifier is used to protect the amplifier. As further described below, components of the apparatus are configured to form a laser cavity having an optical feedback loop that clamps the inversion level of gain media in the amplifier to a safe limit. That is, the inversion level of the gain media at a protection wavelength is clamped up to a slightly higher level than normally attained in the normal operation of the amplifier, but, not at so high a level that damaging levels of inversion and gain are experienced.

FIG. 1 presents a schematic view of an embodiment of an optical apparatus 100 of the disclosure. In some cases, the optical apparatus 100 can be or include an amplifier for an input or output circuit, e.g., an amplifier embodied in a receiver or transmitter for a planar lightwave circuit (PLCs), e.g., as an input PLC or output PLC.

As illustrated in FIG. 1, the apparatus 100 comprises a waveguide pathway 105 configured to receive an input light 107 carrying an optical signal 108 at an input wavelength. The apparatus 100 also comprises an optical gain medium 110 in the waveguide pathway 105, the optical gain medium 110 configured to amplify the optical signal. The apparatus 100 further comprises an optical feedback loop 112 that includes the optical gain medium 110 and at least a portion (e.g., portion 115 and portion 116) of the waveguide pathway 105. A maximum gain of light 118 (e.g., emitted light 118) within the optical feedback loop 112 occurs at a protection wavelength. The protection wavelength is different from the input wavelength of the input light 107. A net round trip gain (or feed back) of the light 118 at the protection wavelength through the optical feedback loop 112 is greater than or equal to one in the absence of the input light 107.

When the net round trip gain is greater than or equal to one, the feedback loop 112, together with at least one pump source (e.g., one or both of pump source lasers 120, 122) forms a laser cavity 125. The feedback loop 112 of the laser cavity 125 is configured to lase at the protection wavelength and at a gain level that is not damaging to the apparatus 100 or other optical components connected to apparatus 100.

A non-damaging, safe, gain level depends upon the specific design parameters of the components of the apparatus 100, including the optical gain medium 110. As non-limiting examples, in various embodiments, the optical gain medium 110 may be rated to tolerate up to 1, up to 10, or up 100 percent, or higher, over the amplifier stage gain in its normal operating gain condition. For instance, under normal operating conditions an embodiment of the optical gain medium 110 may be designed to operate at 5 Watts of optical power and to safely tolerate 10 Watts of power. For such an embodiment, feedback loop 112 of the laser cavity can be configured to lase at the protection wavelength up to 10 Watts gain power (e.g., 100 percent over the amplifier stage gains of its normal operating gain condition).

One skilled in the pertinent arts would understand how the pump source (e.g., lasers 120, 122) can be configured to emit pump source light 127 into the waveguide pathway 105 as part of facilitating stimulated emission (STE) of elevated energy state ions in the gain medium 110. As a non-limiting example, when the gain medium 110 is in the presence of an input light 107 the pump source 120, 122 may emit light 127 in the 800 nm to 1000 nm range to facilitate stimulated emission (STE) of ions in the optical gain medium 110 which are in an elevated energy state, due to absorption of the pump light 127. In some embodiments, the input light 107 can be in any one of the common optical telecommunications bands, including the Original (e.g., about 1260 to about 1360 nm), Extended (e.g., about 1360 to about 1460 nm), Short (e.g., about 1460 to about 1530 nm), Conventional (e.g., about 1530 to about 1565 nm), Long (e.g., about 1565 to about 1625 nm) and/or Ultralong (e.g., about 1625 to about 1675 nm) bands.

The term, waveguide pathway 105 as used herein, refers to an optical waveguide (e.g., a planar optical waveguide or an optical fiber) or a portion of free space, through which a collimated optical beam corresponding to the input light 107 can travel. In some embodiment, the waveguide pathway 105 is referred to an optical waveguide 105 to signify embodiments where there are no free space portions present in the pathway traveled by the light 107. That is, the light 107 travels entirely through physical waveguides.

One skilled in the pertinent arts would be familiar with various configurations of the pump source to facilitate amplification of the input light 107 in the optical gain medium 110. In some embodiments, there can be a single pump source (e.g., one of lasers 120 or 122) while in other embodiments as illustrated in FIG. 1 there can be two pump sources 120, 122. In some embodiments, as illustrated in FIG. 1, the pump sources 120, 122 can be configured as bi-directional pump stages. In other embodiments the pump sources 120, 122 can be configured as co-pump stages or counter-pump stages. In some embodiments, the pump source can be configured to emit pump light at a short wavelength, and therefore higher energy, than the wavelength of the input light 107 to facilitate amplification of the input light 107 in the optical gain medium 110.

As illustrated in FIG. 1, in some embodiments, the cavity laser 125 can further include one or more pump combiner 130, 132 each pump combiner configured to couple a pump source to the optical gain medium. For example, pump combiners 130, 132 can respectively couple pump sources 120, 122 to the optical gain medium 110 via the waveguide pathway 105. In some embodiments, the pump combiners can each be configured as tapered fiber bundles. Some embodiments of the pump combiners can be configured to couple the pump light 127 into either the cladding or the core of the waveguide pathway 105. One skilled in the pertinent art would be familiar with other types of pump combiner configurations.

The protection wavelength of the emitted light 118 differs from the input wavelength of the input light 107 by an amount sufficient that light at the input wavelength (e.g., when the source of the input light 107 is absent) is not substantially amplified in the feedback loop 112, and in particular, such that the roundtrip gain of light at the input wavelength is less than one. For example, in some embodiments, the protection wavelength is different from the wavelength of the input light 107 by at least about 0.1 percent, and in some embodiment, at least about 1 percent and in some embodiments at least about 5 percent, and in some embodiments at least about 20 percent.

In some embodiments, to facilitate the use of common optical components (e.g., filters and isolators), the protection wavelength is within the same telecommunication band as the input light 107. For example, when the wavelength of the input light 107 is in the Conventional-band, then the protection wavelength is also in the Conventional-band. As a non-limiting example, in an embodiment where the input light 107 wavelength equals about 1550 nm, then the protection wavelength can differ from the input wavelength by at least about 1.5 nm. Continuing with the same example, when the input light 107 wavelength equals 1550 nm, then the protection wavelength can differ from the input wavelength by at least about 15 nm, and in some embodiments, at least about 75 nm. In other embodiments, however, the protection wavelength may be in a different telecommunication band than the input wavelength.

In some embodiments, the optical gain medium 110 includes, or is, a doped fiber amplifier (e.g., rare-earth doped optical fiber). One skilled in the pertinent arts would be familiar with types of optically transparent fibers (e.g., crystals, ceramics, or glasses) that can be doped with metal atom dopants (e.g., chromium (Cr), neodymium (Nd), erbium (Er), thulium (Tm), ytterbium (Yb),) to form an amplifier fiber having an excitation bandwidth within one the common telecommunication bands. Non-limiting examples include erbium-doped silicon fibers or yttrium doped aluminum garnet crystal fibers.

One skilled in the pertinent arts would be familiar with other embodiments of the optical gain medium 110, such as, but not limited to, semiconductor optical amplifiers.

In some embodiments, the optical feedback loop 112 includes a strong reflector 140 connected to the portion 115 of the waveguide pathway 105 on an input side 144 of the gain medium 110 and a weak reflector 146 connected to the portion 116 of the waveguide pathway 105 on an output side 148 of the gain medium 110. The strong reflector 140 has a higher reflectivity at the protection wavelength than the weak reflector 146 at the protection wavelength. In such embodiments, the strong and weak reflectors 140, 144 help to define the boundaries of the optical feed back loop 112.

In some embodiments, the term strong reflector, as used herein, is defined as having a reflectivity at the protection wavelength of about 80 percent or greater, and in some embodiments, about 90 percent or greater, and in some embodiments of about 99 percent or greater. In some embodiments, the term weak reflector as used herein, is defined as a reflectivity at the protection wavelength about 80 percent or less and in some embodiments, about 50 percent or less.

In some embodiments, to reduce the presence of ghosts or reflections of the optical signal, both the strong and weak reflectors are substantially transparent at the wavelength of the input light 107. In some embodiments, the term substantial transparent, is defined as a reflectivity at the wavelength of the input light 107 of about 20 percent or less, and in some embodiments, about 10 percent or less, and in some embodiments, about 1 percent or less.

The strong and weak reflectors 140, 146 can be configured to control a range of wavelengths of light that are reflected and, thereby control the bandwidth of wavelengths that are reflected, thereby facilitating control and adjustment of the round trip gain in the gain medium 110.

For instance, in some embodiments, the strong reflector 140 includes, or is, a first Bragg grating and the weak reflector 146 includes, or is, second Bragg grating, at the protection wavelength. Alternatively in some embodiments, the strong reflector 140 includes, or is, a first wavelength selective mirror, and the weak reflector 146 includes, or is, a second wavelength selective mirror at the protection wavelength. One skilled in the pertinent arts would be familiar with how to configure such reflectors 140, 146 to have strong or weak reflectivity at the protection wavelength and to be substantial transparency at the input wavelength.

In some embodiments, to reduce ghosts or reflected optical signals from returning to an input source (or input port) 150 that delivers the input light 107, the apparatus 100 can further include an optical isolator 155 located in-between the optical feedback loop 112 and the input source 150. One skilled in the pertinent art would be familiar with various configurations of optical isolators. As a non-limiting example, the optical isolator 155 can include polarizers and Faraday rotators configured to allow light of only one direction to pass through the optical isolator 155 from the input source to the optical feed back loop 112 and deter reflected light (e.g., light reflected from the strong reflector 140) of another polarization from passing in the opposite direction through the optical isolator 155 back to the input source 150.

Some embodiments of the input source 150 can be or include one or more lasers configured to emit light 107 at the input wavelength and to carry the optical signal. In some embodiments, the input source 150 can be or include an optical amplifier including but not limited to embodiments of optical amplifiers described herein. One of ordinary skill in the pertinent art would be familiar with the various configuration of the optical power dump 160. As a non-limiting example, embodiments of the optical power dump 160 can include a series of light absorbing (e.g., black) metal layers that are spaced apart from each other.

In some embodiments, to facilitate dissipation of the light at the protection wavelength, the apparatus 100 can further include an optical power dump 160 connected to the waveguide pathway 105 at a location (e.g., at coupling junction 162) in-between the optical feedback loop 112 and an output port 165 of the apparatus 100. Optical power at the protection wavelength exiting the optical feedback loop 112 can thereby be diverted away from the output port 165 and into the optical power dump 160 so that this power does not reach and potentially damage other optical components of the apparatus 100. One of ordinary skill in the pertinent art would be familiar with various configuration of the optical power dump 165. As a non-limiting example, embodiments of the optical power dump 165 can include a series of light absorbing (e.g., black) metal layers that are spaced apart from each other.

Figure 2:
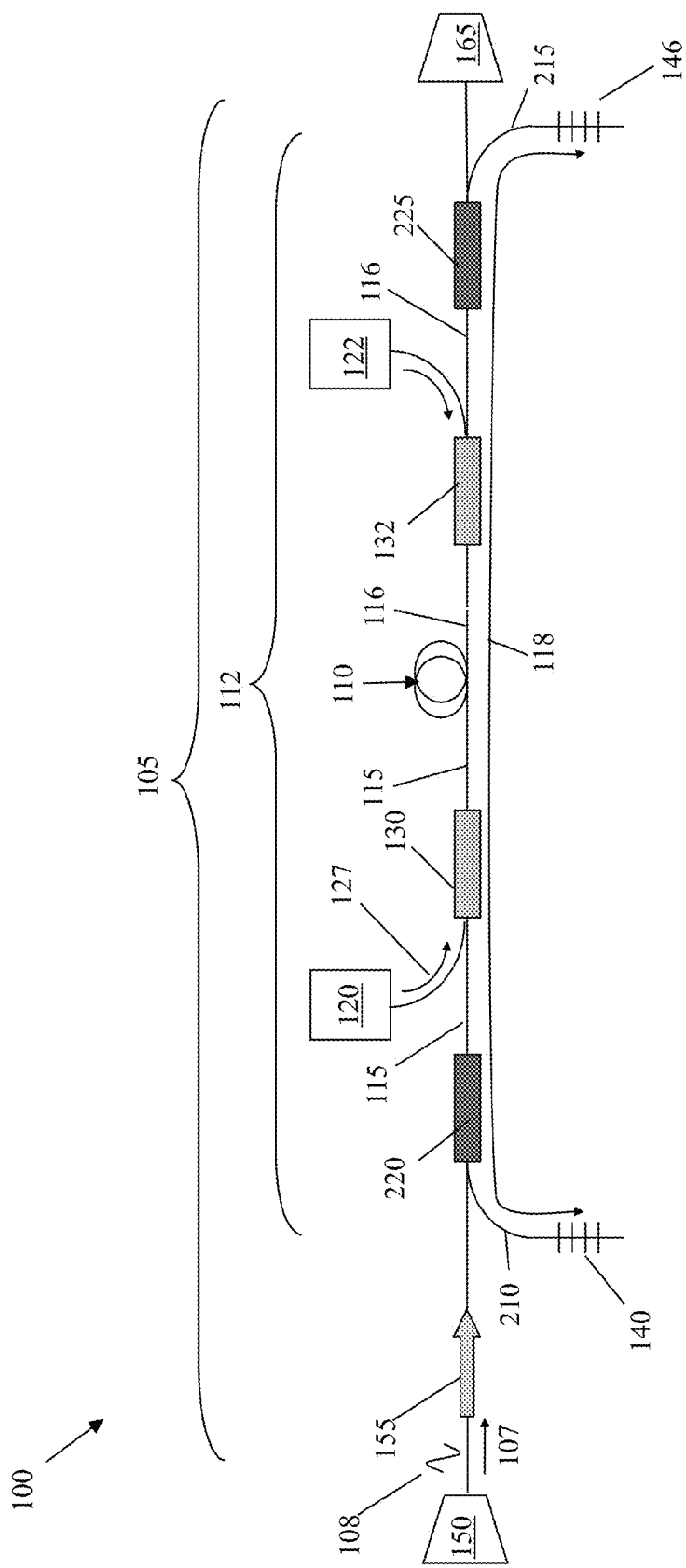
FIG. 2 presents a schematic view of another embodiment of an apparatus similar to the embodiment depicted in FIG. 1, where the strong and weak reflectors are located in waveguide tails connected to a waveguide pathway that includes an optical feedback loop.

FIG. 2 presents a schematic view of another embodiment of an apparatus 100 similar to the embodiment depicted in FIG. 1, where the strong and weak reflectors 140, 146 are located in first and second waveguide tails 210, 215 connected to the waveguide pathway 105 that includes the optical feedback loop 112. Embodiments of the first and second waveguide tails 210, 215 can be compose of the same or difference waveguide materials as the waveguide material that define the waveguide 105 and in some embodiments can be extensions or part of the waveguide pathway 105 (e.g., second and third optical fiber, and/or rigid, waveguides).

As further illustrated in FIG. 2, in some embodiments, the first and second waveguide tails 210, 215 are coupled to the waveguide pathway 105 at first and second coupling junctions, 220 225. In some embodiments, the coupling junctions 220, 225 can be or include tapered optical fiber bundles familiar one of ordinary skill in the pertinent art. In some embodiments, the coupling junctions 220, 225 can be or include first and second wavelength division multiplexers (WDMs), respectively. In some embodiments the coupling junctions configured as WDMs 220, 225 are preferred over tapered optical fiber bundles because WDMs can more effectively reduce the amount of optical power that the strong and weak reflectors 140, 146 are exposed to. For instance, in some embodiments, the strong and weak reflectors 140, 146 could otherwise receive light at wavelengths, e.g., the wavelength of the input light 105 in embodiments, which could be a damaging to the one or both of the strong and weak reflectors 140, 146. For instance, in some embodiments the WDMs 220, 225 can be configured prevent the input light 105 from entering the first and second waveguide tails 210, 215 and reaching the strong and weak reflectors 140, 146.

Figure 3:
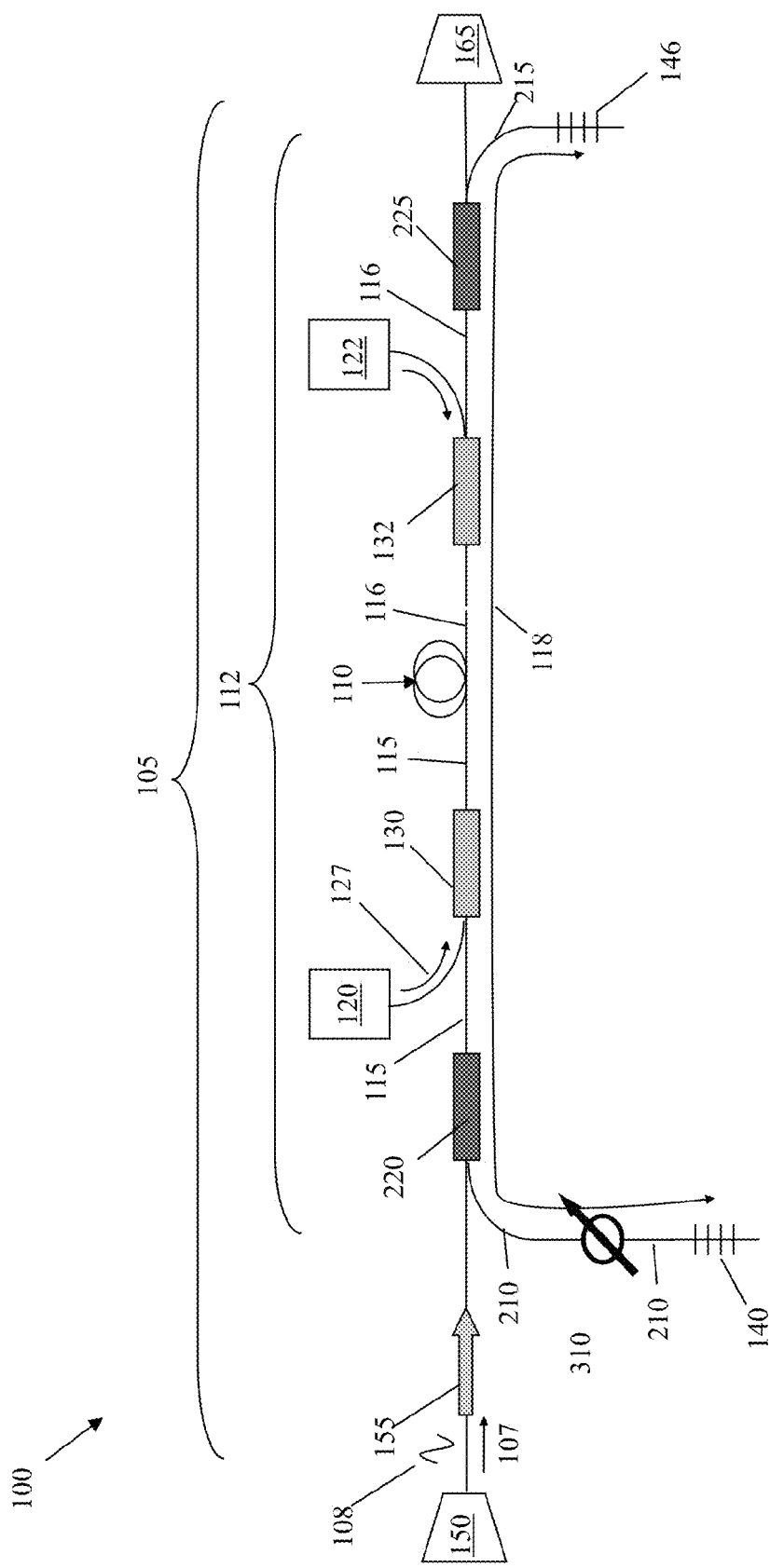
FIG. 3 presents a schematic view of another embodiment of an apparatus similar to the embodiment depicted in FIG. 2 and including a variable optical attenuator, in at least one of the waveguide tails.

FIG. 3 presents a schematic view of another embodiment of an apparatus similar to the embodiment depicted in FIG. 2 and including at least one variable optical attenuator 310, in at least one of the waveguide tails 210, 215. For instance, as illustrated, the first waveguide tail 210 can further include a variable optical attenuator 310 in-between the strong reflector 140 and a coupling junction 220 to the waveguide pathway 105. Additionally or alternatively, in some embodiments it can be advantageous for the second waveguide tail 215 to further includes the variable optical attenuator 310 in-between the weak reflector 146 and a coupling junction 225 to the waveguide pathway 105. One skilled in the pertinent art would be familiar with different types optical attenuators, such as absorbing or reflecting optical attenuators. In some embodiments, it is advantageous for the variable optical attenuator 310 to be substantially non-absorbing at the wavelength of the input light 107 so that any input light 107 traveling through the optical tails 210, 215 does not get absorbed by and heat up the variable optical attenuator 310. For instance, in some embodiments the transmittance of light at the input wavelength is at least about 90 percent, and in some embodiments, at least about 99 percent.

The variable optical attenuator 310 can be adjusted to facilitate fine-tuning of the roundtrip gain of the optical feed back loop 112, when necessary. In some embodiments, for example, it may be difficult to provide strong and weak reflectors 140, 146 with the exact target reflectivity at the protection wavelength. For example, fabrication variations in the strong and weak reflectors 140, 146, configured as Bragg gratings, can be large enough to result in larger-than-desired variations in the reflectivity of one or both of the strong or weak reflectors 140, 146. Variations in the reflectivity of these reflectors 140, 146, in turn, can cause the round trip gain at the protection wavelength to be higher or lower than desired to clamp the inversion level of gain media 110 at a safe limit. Including the variable optical attenuator 310 in one of the waveguide tails 210, 215 allows the round trip gain to be adjusted to a target safe gain limit. In some embodiments one or both of the reflectors 140, 146 can be fabricated, by design, to have a higher reflectivity than desired at the protection wavelength. Then the variable optical attenuator 310 can be adjusted to fine-tune the round trip gain to the target safe gain limit.

In some embodiments, it can be advantageous for the second waveguide tail 215 to further include the variable optical attenuator 310 located in-between the weak reflector 146 and a coupling junction 225 to the waveguide pathway 105. In some embodiments, where the weak reflector 146 can reflect input wavelengths, locating the variable optical attenuator 310 in-between the weak reflector 146 and the coupling junction 225 can help prevent ghost or reflected signals at the input wavelength from reaching the output port 165.

In some embodiments, it can be advantageous to use coupling junctions configured as WDMs 220, 225 when using a variable optical attenuator 310 because WDMs often can absorb more optical power than variable optical attenuators. The presence of the WDM as part of the coupling junctions 220, 225 helps to prevent excessive optical power from reaching the variable optical attenuator 310.

Figure 4:
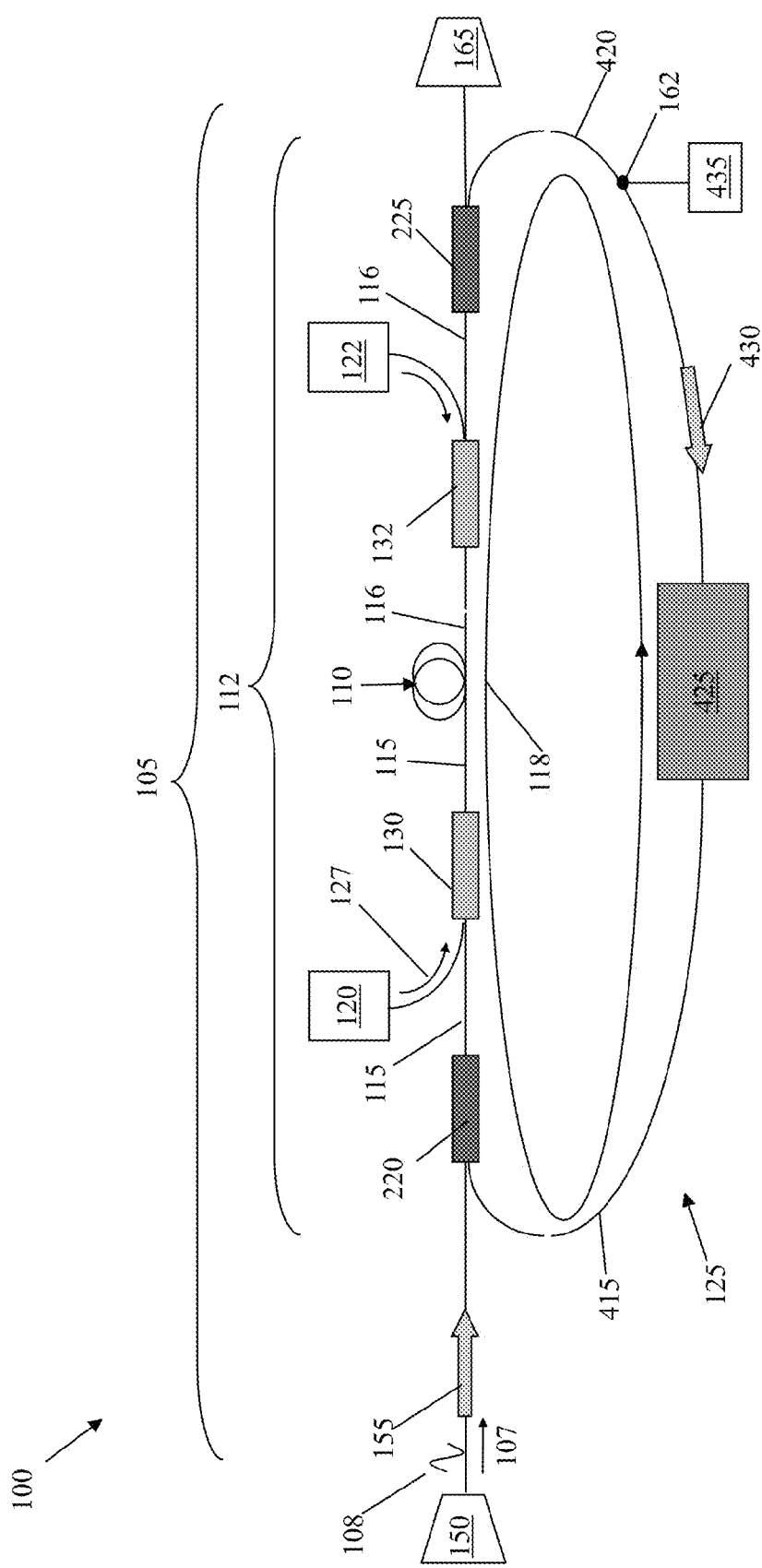
FIG. 4 presents a schematic view of another embodiment of an apparatus of the disclosure, having an optical feedback loop that is part of a ring laser.

FIG. 4 presents a schematic view of another embodiment of an apparatus 100 of the disclosure, having an optical feedback loop 112 that is part of a cavity laser 125 configured as ring laser. As illustrated in FIG. 4, such embodiments do not have strong and weak reflectors that define the optical feed back loop 112.

The ring laser 125, in addition to the optical feedback loop 112, and pump sources 120, 122 can further include a second waveguide pathway 415 (e.g., waveguide), a third waveguide pathway 420 (e.g., waveguide), and a band pass filter 425. The second waveguide pathway 415 is coupled to a first coupling junction (e.g., coupling junction 220) on the waveguide path 105 located in-between an input source 150 and the optical gain medium 110. The third waveguide pathway 420 coupled to a second coupling junction (e.g., coupling junction 225) on the waveguide path 105 located in-between an output port 165 and the optical gain medium 110. The band pass filter 425 couples the second waveguide pathway 415 to the third waveguide pathway 420.

The band pass filter 425 can be configured to block or filter optical feedback at wavelengths other than the protection wavelength and thereby facilitate forming a round trip gain equal to or greater than 1 at the protection wavelength. In some embodiments the transmittance of wavelengths outside of the band pass is about 1 percent or less and in some embodiments about 0.1 percent. In some embodiments, the band pass band width of the band pass filter 425 equal to about ±0.5 nm, and in some embodiments, about ±5 nm, and in some embodiments, about ±50 nm.

As further illustrated in FIG. 4, to reduce the amount of light that is reflected back to the optical gain media 112, some embodiments of the apparatus 100 can further include an isolator 430. The isolator can be any of the types of isolators discussed in the context of FIG. 3. Some embodiments, the isolator 430 in the third waveguide pathway 420, located in-between the second coupling junction 225 and the band pass filter 425. Placing the isolator in this position facilitates moving the optical power towards the output port 165, e.g., in a clockwise direction in the schematic view depicted in FIG. 4. In the absence of the isolator 430 about half of the optical power would move towards the input source 150, e.g., in a counter-clockwise direction and potentially damage the input source.

In some embodiments, to further reduce any reflected power from reaching the input source 150 the first and second coupling junctions 220, 225 can include or be WDM couplers. In some embodiments, facilitate the absorption of optical power, the third waveguide pathway 420 can be alternatively or further coupled to a power dump 435 coupled to a coupling junction 162 located in-between the band pass filter 425 and the second coupling junction 225.

With continuing reference to FIGS. 1-4 alternative embodiments of the apparatus 100 are described below.

Embodiments of the apparatus 100 include an optical waveguide 105 configured to receive an optical signal 108 at an input wavelength 107, the optical waveguide 105 including an optical gain medium 110. The apparatus 100 can also comprise one or more optical pump sources 120, 122 connected to transmit pump light 127 to the optical gain medium 110 such that the optical gain medium 110 is able to amplify the optical signal 108. The apparatus 100 can also comprise an optical feedback loop 112 that includes the optical gain medium 110 and at least a portion of the optical waveguide (e.g., portion 115 and portion 116). In some embodiments, the round-trip optical gain of the optical feedback loop 112 at the protection wavelength of emitted light 118 is greater than or equal to unity in the absence of the input light 107 in the optical gain medium 110 and the round-trip optical gain of the optical feedback loop 112 at the protection wavelength of emitted light 118 is less than unity in the presence of the input light 107 in the optical gain medium 110.

In some embodiments, the round-trip optical gain of the optical feedback loop 112 at the protection wavelength of emitted light 118 is greater than or equal to unity in the absence of the input light 107 in the optical gain medium 110 and the round-trip optical gain of the optical feedback ioop 112 at the protection wavelength of emitted light 118 is less than unity in the presence of the input light 107 in the optical gain medium 110.

In some embodiments, the optical feedback loop 112 includes a first reflector 140 physically connected to the optical waveguide 105 on an input side 144 of the optical gain medium 110 and the second reflector 145 connected to an output side 146 of the gain medium 110, wherein the first reflector 140 has a higher reflectivity than the second reflector 145 at the protection wavelength of emitted light 118. In some such embodiments, the first and second reflectors 140, 145 reflect light more weakly at the wavelength 107 of the optical signal 108 than at the protection wavelength of emitted light 118. In some such embodiments, at least one of the first and second reflectors 140, 145 is coupled to the optical waveguide 105 by another optical waveguide 210, 215 located to not receive the optical signal 108. In some such embodiments, the other optical waveguide 210, 215 is coupled to the optical waveguide 105 configured to receive the optical signal 108 by the wavelength division multiplexer 220, 225. In some such embodiments, the other optical waveguide 210, 215 further includes a variable optical attenuator 310. In some such embodiments, a variable optical attenuator 310 is located between each of the reflectors 140, 145 and the optical waveguide 105.

In some embodiments, the apparatus 100 further includes an optical isolator 430 located in-between the optical feedback loop 112 and an input port 150 for the input light 107.

In some embodiments, the apparatus 100 further includes an optical power dump 160 optically connected to the optical waveguide 105 at a location 162 between the optical feedback loop 112 and an optical output port 165 of the apparatus.

In some embodiments, the optical feedback loop 112 is part of a ring laser 135. The ring laser 135 can further include a second optical waveguide 415 coupled to a first coupling junction 220 on the first optical waveguide 105 located in-between an input port 150 and the gain medium 110. The ring laser 135 can further include a third optical waveguide 420 coupled to a second coupling junction 225 on the first optical waveguide 105 located in-between an optical output port 165 and the optical gain medium 110. The ring laser 135 can further include a band pass filter 425 coupling the second optical waveguide 415 to the third optical waveguide 420. In some such embodiments, the apparatus 100 further includes an isolator 430 in the third optical waveguide 420 located in-between the second coupling junction 225 and the band pass filter 425. In some such embodiments, the first and second coupling junctions 220, 225 include wavelength division multiplexers. In some such embodiments, the third optical waveguide 420 is coupled to a power dump 435 coupled to a coupling junction 162 located in-between the band pass filter 425 and the second coupling junction 225.

Figure 5A:
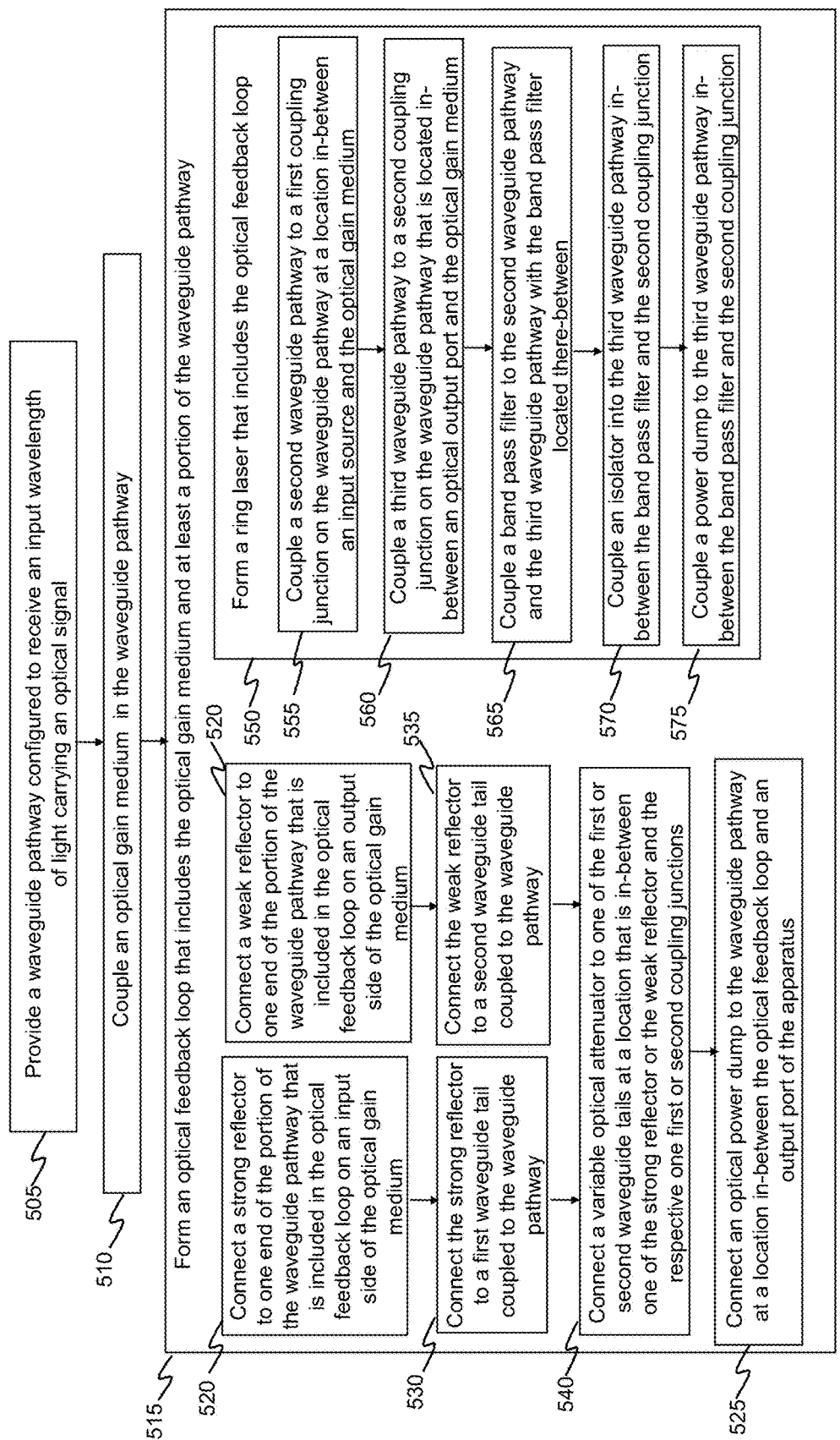
FIG. 5A presents a flow diagram illustrating a method of manufacturing an apparatus of the disclosure, such as any of the embodiments of the apparatuses discussed in the context of FIGS. 1-4.

Another embodiment is a method, e.g., a method of manufacturing an optical apparatus. FIG. 5A presents a flow diagram illustrating a method of the disclosure, such as applied to make any of the embodiments of the apparatuses 100 discussed in the context of FIGS. 1-4. With continuing reference to FIGS. 1-4, embodiments of the method of manufacture comprise a step 505 of providing a waveguide pathway 105 configured to receive an input wavelength of light 107 carrying an optical signal. The method also comprises a step 510 of coupling an optical gain medium 110 in the waveguide pathway 105, the optical gain medium 105 configured to amplify the optical signal. The method further comprises a step 515 of forming an optical feedback loop 112 that includes the optical gain medium 110 and at least a portion 115, 116 of the waveguide pathway 105.

As discussed above in the context of FIGS. 1-4, a maximum round-trip gain of light 118 within the optical feedback loop 112 occurs at a protection wavelength, the protection wavelength is different from the input wavelength, and a net round trip gain of the of the light amplitude at the protection wavelength through the optical feedback loop 112 is greater than or equal to one in the absence of the input light 107, and is less than one in the presence of the input light 107.

Some embodiments of the method includes a step 520 of connecting a strong reflector 140 to one end of the portion 115 of the waveguide pathway that is included in the optical feedback loop 112 on an input side 144 of the optical gain medium 110. Some embodiments of the method include a step 522 of connecting a weak reflector 146 to one end of the portion 116 of the waveguide pathway that is included in the optical feedback loop on an output side 148 of the optical gain medium 110. The strong reflector 140 has a higher reflectivity than the weak reflector 145 at the protection wavelength.

Some embodiments of the method include a step 525 of connecting (e.g., at junction 162) an optical power dump 160 to the waveguide pathway 105 at a location in-between the optical feedback loop 112 and an output port 165 of the apparatus 100.

Some embodiments of the method include a step 530 of connecting the strong reflector 140 to a first waveguide tail 210 coupled to the waveguide pathway 105 at a coupling junction 220 located in-between an input source 150 and the optical gain medium 110. Some embodiments of the method include a step 535 of connecting a weak reflector 146 to a second waveguide tail 210 coupled to the waveguide pathway 105 at a coupling junction 225 located in-between an output port 165 and the optical gain medium 110.

Some embodiments of the method include a step 540 of connecting a variable optical attenuator 310 to one of the first or second waveguide tails 210, 215 at a location that is in-between one of the strong reflector 140 or the weak reflector 146 and the respective one first or second coupling junctions 220, 225.

Some embodiments of the method include a step 550 of forming a ring laser 125 that includes the optical feedback loop 112. Forming the ring laser 125 includes a step 555 of coupling a second waveguide pathway 415 to a first coupling junction 220 on the waveguide pathway 105 at a location in-between an input source 150 and the optical gain medium 110. Forming the ring laser 125 includes a step 560 of coupling a third waveguide pathway 420 to a second coupling junction 225 on the waveguide pathway 105 that is located in-between an optical output port 165 and the optical gain medium 110. Forming the ring laser 125 includes a step 565 of coupling a band pass filter 425 to the second waveguide pathway 415 and to the third waveguide pathway 420 such that the band pass filter 425 is located in-between the second waveguide pathway 415 and the third waveguide pathway 420.

In some embodiments, forming the ring laser 125 includes a step 570 of coupling an isolator into the third waveguide pathway 420 in-between the band pass filter 425 and the second coupling junction 225. In some embodiments, forming the ring laser 125 includes a step 575 of coupling a power dump 160 to the third waveguide pathway 420 in-between the band pass filter 425 and the second coupling junction 225. In other embodiments however the power dump 160, or a second power dump, could be connected to other locations in the ring laser 125 such as the second waveguide pathway 415 or to portions of the waveguide pathway 105.

FIG. 5B presents a flow diagram illustrating an alternative method of the disclosure.

The method comprises a step 580 of providing an optical waveguide 105 having an optical gain medium 110 therein, to amplify an optical signal 108 input 107 into the optical waveguide 105, the optical waveguide 105 including an optical feedback loop 112. The method also comprises a step 585 of coupling a source of pump light 127 to the optical waveguide 105 such that the pump light 127 is able to cause the gain medium 110 to amplify an optical signal 108 input 107 into the optical waveguide 105, wherein an optical gain is such that the round trip gain in the optical feedback loop 112 for the protection wavelength of emitted light 118 is less than unity in the presence of the optical signal 108 input 107, and wherein an optical gain is such that the round trip gain in the optical feedback loop 112 for the protection wavelength is greater than or equal to unity in the absence of the optical signal 108 input 107.

Figure 6:
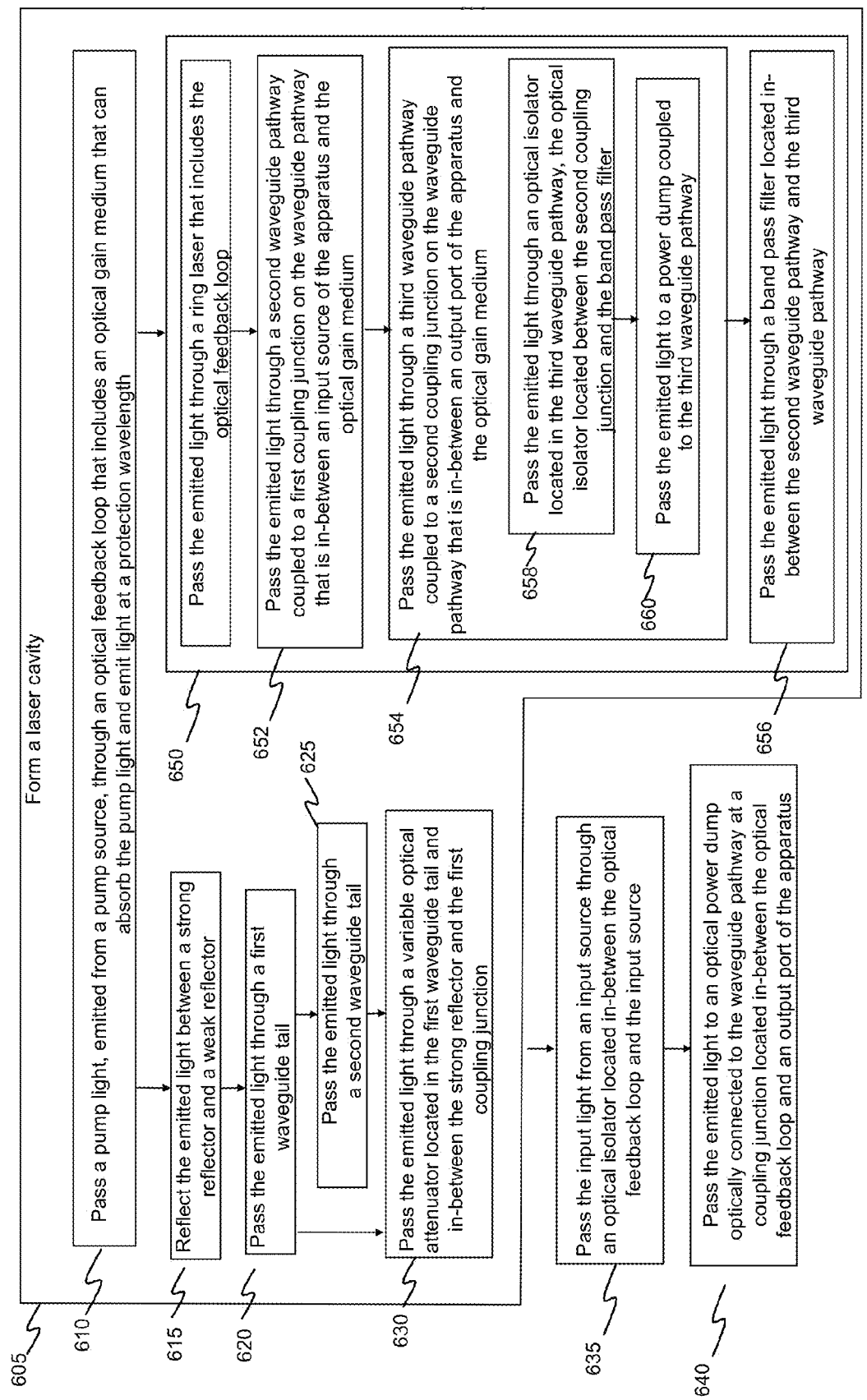
FIG. 6 presents a flow diagram illustrating another alternative method of the disclosure.

FIG. 6 presents a flow diagram illustrating another method of the disclosure, such method using any of the embodiments of the apparatuses 100 discussed in the context of FIGS. 1-4. With continuing reference to FIGS. 1-5, embodiments of the method comprise a step 605 of forming a laser cavity 125, including the steps 610 of passing a pump light 127, emitted from a pump source (e.g., sources 120, 122), through an optical feedback loop 112 that includes an optical gain medium 110 that can absorb the pump light 127 and emit light 118 at a protection wavelength is different from the input wavelength, and a net round trip gain of the light amplitude at the protection wavelength through the optical feedback loop 112 is greater than or equal to one in the absence of the input light 107, and is less than one in the presence of the input light 107.

In some embodiments, passing the emitted light 118 through the optical feedback loop 112 in step 610 includes a step 615 of reflecting the emitted light 112 between a strong reflector 140 and a weak reflector 146. The strong reflector is connected to a first portion 115 of the waveguide pathway 105 located on an input side 144 of the optical gain medium 110. The weak reflector is connected to a second portion 116 of the waveguide pathway located on an output side 148 of the optical gain medium 110. The strong reflector 140 has a higher reflectivity than the weak reflector 146 at the protection wavelength.

In some embodiments, passing the emitted light 118 through the optical feedback loop 112 in step 610 includes a step 620 of passing the emitted light 118 through a first waveguide tail 210. The first waveguide tail 210 is coupled to the waveguide pathway 105 at a first coupling junction 210 that is located in-between the optical gain medium 110 and an input source 150 for the input light 105, and, the strong reflector 140 is included in the first waveguide tail 210. In some embodiments, passing the emitted light 118 through the optical feedback loop 112 in step 610 includes a step 625 of passing the emitted light 118 through a second waveguide tail 215. The second waveguide tail 215 is coupled to the waveguide pathway 105 at a second coupling junction 215 that is located in-between the optical gain medium 110 and an output port 165, and, the weak reflector 146 is included in the second waveguide tail 215.

In some embodiments, passing the emitted light 118 through the optical feedback loop 112 in step 610 includes a step 630 of passing the emitted light 118 through a variable optical attenuator 310 located in the first waveguide tail and in-between the strong reflector 140 and the first coupling junction 220.

In some embodiments, the method further includes a step 635 of passing the input light 107 from an input source 150 through an optical isolator 155 located in-between the optical feedback loop 112 and the input source 150.

In some embodiments, the method further includes a step 640 of passing the emitted light 118 to an optical power dump 160 optically connected to the waveguide pathway 105 at a coupling junction 162 located in-between the optical feedback loop 112 and an output port 165 of the apparatus 100.

In some embodiments, passing the emitted light 118 through the optical feedback loop 112 in step 610 includes a step 650 of passing the emitted light 118 through a ring laser 125 that includes the optical feedback loop 112. Passing the emitted light 118 through the ring laser 125 includes a step 652 of passing the emitted light 118 through a second waveguide pathway 415 coupled to a first coupling junction 220 on the waveguide pathway 105 that is in-between an input source 150 of the apparatus 100 and the optical gain medium 110. Passing the emitted light 118 through the ring laser 125 includes a step 654 of passing the emitted light 118 passing the emitted light through a third waveguide pathway 420 coupled to a second coupling junction 225 on the waveguide pathway 105 that is in-between an output port 165 of the apparatus 100 and the optical gain medium 110. Passing the emitted light 118 through the ring laser 125 includes a step 656 of passing the emitted light through a band pass filter 425 located in-between the second waveguide pathway 415 and the third waveguide pathway 420.

In some embodiments, passing the emitted light 118 through the third waveguide pathway 420 in step 654 includes passing the emitted light 118 through an optical isolator 430 located in the third waveguide pathway 420, the optical isolator 430 located between the second coupling junction 225 and the band pass filter 430.

In some embodiments, passing the emitted light 118 through the third waveguide pathway 420 in step 654 includes a step 660 of passing the emitted light 118 to a power dump 160 coupled to the third waveguide pathway 420 at a third coupling junction 162 located in-between the second coupling junction 225 and the band pass filter 425, or in some cases, the optical isolator 430.

Embodiments of the methods discussed in the context of FIG. 5A, 5B and 6 could further or alternatively include any of the steps discussed in the context any of the other method steps discusses in the context of the other figures.

Those skilled in the art to which this application relates will appreciate that other and further additions, deletions, substitutions and modifications may be made to the described embodiments.

What is claimed is:

1. An optical apparatus, comprising:
   an optical waveguide configured to receive an optical signal at an input wavelength, the optical waveguide including an optical gain medium;
   one or more optical pump sources connected to transmit pump light to the optical gain medium such that the optical gain medium is able to amplify the optical signal; and
   an optical feedback loop for a protection wavelength that includes the optical gain medium and at least a portion of the optical waveguide,
   wherein a round-trip gain of the optical feedback loop for the protection wavelength is less than unity in the presence of the optical signal, and
   wherein the round-trip gain of the optical feedback loop for the protection wavelength is greater then equal or equal to unity in the absence of the optical signal.

2. The apparatus of claim 1, wherein the input wavelength is within a range that includes one of an Original, Extended, Short, Conventional, Long or Ultra-long optical telecommunication optical bands.

3. The apparatus of claim 1, wherein the wavelength of the pump light is different from the wavelength of the input wavelength by at least about 20 percent.

4. The apparatus of claim 1, wherein the optical gain medium includes a rare-earth doped optical fiber.

5. The apparatus of claim 1, wherein the optical gain medium includes a semiconductor optical amplifier.

6. The apparatus of claim 1, wherein the optical feedback loop includes a first reflector physically connected to the optical waveguide on an input side of the optical gain medium and a second reflector connected to an output side of the gain medium, wherein the first reflector has a higher reflectivity than the second reflector at the wavelength of the protection light.

7. The apparatus of claim 6, wherein the first and second reflectors reflect light more weakly at the wavelength of the optical signal than at the wavelength of the protection light.

8. The apparatus of claim 5, wherein at least one of the first and second reflectors is coupled to the optical waveguide by another optical waveguide located to not receive the optical signal.

9. The apparatus of claim 8, wherein the another optical waveguide tails is coupled to the optical waveguide configured to receive the optical signal by a wavelength division multiplexer.

10. The apparatus of claim 8, wherein the another optical waveguide further includes a variable optical attenuator.

11. The apparatus of claim 8, wherein a variable optical attenuator is located between each of the reflectors and the optical waveguide.

12. The apparatus of claim 1, further includes an optical isolator located in-between the optical feedback loop and an input port for the input light.

13. The apparatus of claim 1, further includes an optical power dump optically connected to the optical waveguide at a location between the optical feedback loop and an optical output port of the apparatus.

14. The apparatus of claim 1, wherein the optical feedback loop is part of a ring laser that further includes:
   a second optical waveguide coupled to a first coupling junction on the first optical waveguide located in-between an input source and the gain medium;
   a third optical waveguide coupled to a second coupling junction on the first optical waveguide located in-between an optical output port and the optical gain medium; and
   a band pass filter coupling the second optical waveguide to the third optical waveguide.

15. The apparatus of claim 14, further including an isolator in the third optical waveguide located in-between the second coupling junction and the band pass filter.

16. The apparatus of claim 14, wherein the first and second coupling junctions include wavelength division multiplexers.

17. The apparatus of claim 14, the third optical waveguide is coupled to a power dump coupled to a coupling junction located in-between the band pass filter and the second coupling junction.

18. A method, comprising:
   providing an optical waveguide having an optical gain medium therein, to amplify an optical signal input into the optical waveguide, the optical waveguide including an optical feedback loop for a protection wavelength; and
   coupling a source of pump light to the optical waveguide such that the pump light is able to cause the gain medium to amplify an optical signal input into the optical waveguide;
   wherein a round-trip gain of the optical feedback loop for the protection wavelength is less than unity in the presence of the optical signal, and
   wherein the round-trip gain of the optical feedback loop for the protection wavelength is greater than or equal to unity in the absence of the optical signal.

19. A method, comprising:
   forming a laser cavity, including: passing a pump light, emitted from a pump source, through an optical feedback loop that includes an optical gain medium that can absorb the pump light and emit light at a protection wavelength, wherein:
   the optical feedback loop includes at least a portion of a waveguide pathway that is configured to receive an input light at an input wavelength configured to carry an optical signal,
   a maximum round-trip gain of light within the optical feedback loop occurs at a protection wavelength,
   the protection wavelength is different from the input wavelength, and a net round trip gain in amplitude of the emitted light at the protection wavelength through the optical feedback loop is greater than or equal to one in the absence of the input light.

20. The apparatus of claim 1, wherein at least two optical pumps sources are positioned on opposite ends of the optical feedback loop to transmit pump light.

* * * * *